(12) United States Patent
Yuan et al.

(10) Patent No.: US 11,450,013 B2
(45) Date of Patent: Sep. 20, 2022

(54) METHOD AND APPARATUS FOR OBTAINING SAMPLE IMAGE SET

(71) Applicant: Beijing Xiaomi Pinecone Electronics Co., Ltd., Beijing (CN)

(72) Inventors: Weihang Yuan, Beijing (CN); Jin Wang, Beijing (CN); Taolue Feng, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 98 days.

(21) Appl. No.: 16/931,145

(22) Filed: Jul. 16, 2020

(65) Prior Publication Data

US 2021/0272299 A1 Sep. 2, 2021

(30) Foreign Application Priority Data

Feb. 28, 2020 (CN) .......................... 202010130503.6

(51) Int. Cl.
*G06T 7/33* (2017.01)
*G06T 3/40* (2006.01)
*G06T 5/00* (2006.01)

(52) U.S. Cl.
CPC ............ *G06T 7/337* (2017.01); *G06T 3/4038* (2013.01); *G06T 5/003* (2013.01); *G06T 5/009* (2013.01);
(Continued)

(58) Field of Classification Search
CPC ....... G06T 7/337; G06T 3/4038; G06T 5/003; G06T 5/009; G06T 2207/10024;
(Continued)

(56) References Cited

U.S. PATENT DOCUMENTS

2014/0211034 A1\* 7/2014 Tanaka .................... G06T 5/002
348/218.1
2018/0350042 A1\* 12/2018 Zhang .................... G06T 11/20

OTHER PUBLICATIONS

Antoni Buades et al., "CFA Bayer image sequence denoising and demosaicking chain", Dec. 28, 2018, arxiv.org, Cornell University Library, XP080995199 (Year: 2018).\*

(Continued)

*Primary Examiner* — Chan S Park
*Assistant Examiner* — Daniel C Chang
(74) *Attorney, Agent, or Firm* — Finnegan, Henderson, Farabow, Garrett & Dunner, L.L.P.

(57) ABSTRACT

A method for acquiring a sample image set, includes: acquiring a plurality of frame images continuously shot for a shooting scene; determining, as a reference image, one frame of a plurality of frame images, and determining, as non-reference images, remaining ones of the plurality of frame images other than the one determined as the reference image; performing a format conversion on the reference image and the non-reference images to obtain a format-converted reference image and format-converted non-reference images, and performing a noise addition processing on the format-converted reference image and each non-reference image respectively; aligning each noise-added non-reference image with a noise-added reference image to obtain an aligned non-reference image; annotating the format-converted reference image with pixel information to obtain a non-noise-added reference image; and acquiring the sample image set, the sample image set including the aligned non-reference image, the noise-added reference image, and the non-noise-added reference image.

14 Claims, 10 Drawing Sheets

(52) U.S. Cl.
CPC .............. *G06T 2207/10024* (2013.01); *G06T 2207/10028* (2013.01)

(58) Field of Classification Search
CPC . G06T 2207/10028; G06T 1/00; G06T 5/002; G06T 1/0007; G06T 5/007; G06T 5/50; G06T 7/30; G06K 9/6256; G06K 9/62; G06N 3/0454; G06N 3/08
See application file for complete search history.

(56) References Cited

OTHER PUBLICATIONS

Tim Brooks et al., "Unprocessing Images for Learned Raw Denoising", Nov. 27, 2018, arxiv.org, Cornell University Library, XP080939594 (Year: 2018).*

Brooks T, Mildenhall B, Xue T, et al. "Unprocessing Images for Learned Raw Denoising", 2018, 9 pages.

Abdelhamed A, Lin S, Brown M. S. "A High-Quality Denoising Dataset for Smartphone Cameras", 2017, 9 pages.

Abdelhamed A, Timofte R, et al. "NTIRE 2019 Challenge on Real Image Denoising: Methods and Results", 2019, 14 pages.

Wang X, Chan K C K, Yu K, et al. "EDVR: Video Restoration with Enhanced Deformable Convolutional Networks", 2019, 10 pages.

Tassano M, Delon J, Veit T. "FastDVDnet: Towards Real-Time Video Denoising Without Explicit Motion Estimation", 2020, 13 pages.

Mildenhall B, Barron Jonathan T, et al. "Burst Denoising with Kernel Prediction Networks", 2018, 10 pages.

Kroeger T, Timofte R, Dai D, et al. "Fast Optical Flow using Dense Inverse Search", 2016, 25 pages.

Ronneberger O, Fischer P, Brox T. "U-Net: Convolutional Networks for Biomedical Image Segmentation", 2015, 8 pages.

A. Buades et al: "CFA Bayer image sequence denoising and demosaicking chain", Arxiv. org, Cornell University Library, 201 Olin Library Cornell University Ithaca, NY, Dec. 28, 2018, 20 pages.

Thibaud Ehret et al: "Joint Demosaicking and Denoising by Fine-Tuning of Bursts of Raw Images", 2019 IEEE/CVF International Conference on Computer Vision (ICCV), IEEE, Oct. 27, 2019, 10 pages.

Supplementary European Search Report in European Application No. 20188340.2, dated Jan. 29, 2021.

* cited by examiner

US 11,450,013 B2

METHOD AND APPARATUS FOR OBTAINING SAMPLE IMAGE SET

CROSS-REFERENCE TO RELATED APPLICATIONS

This application is based upon and claims priority to Chinese Patent Application No. 202010130503.6, filed on Feb. 28, 2020, the entire contents of which are hereby incorporated by reference.

TECHNICAL FIELD

The present disclosure generally relates to the field of computer communication technology, and more particularly, to a method and an apparatus for acquiring a sample image set.

BACKGROUND

In the field of digital image processing and computer vision, digital images are a basic source of information. During the acquisition and transmission of digital images by imaging equipment, image noise is generated due to interference from the imaging equipment or the external environment, resulting in reduced quality of digital images.

In order to obtain high-quality digital images, the digital images need to be de-noised. However, the de-noised images based on traditional de-noising technologies may be prone to problems such as ghosting and poor resolution of texture details.

SUMMARY

According to a first aspect of embodiments of the present disclosure, a method for acquiring a sample image set includes: acquiring a plurality of frame images continuously shot for a shooting scene; determining, as a reference image, one of the plurality of frame images, and determining, as non-reference images, remaining ones of the plurality of frame images other than the one determined as the reference image; performing a format conversion on the reference image and the non-reference images to obtain a format-converted reference image and format-converted non-reference images, and performing a noise addition processing on the format-converted reference image and each format-converted non-reference image respectively; aligning each noise-added non-reference image with a noise-added reference image to obtain an aligned non-reference image; annotating the format-converted reference image with pixel information to obtain a non-noise-added reference image; and acquiring the sample image set, the sample image set including the aligned non-reference image, the noise-added reference image, and the non-noise-added reference image.

According to a second aspect of embodiments of the present disclosure, an apparatus for obtaining a sample image set includes: a processor; and a memory configured to store instructions executable by the processor, wherein the processor is configured to: acquire a plurality of frame images continuously shot for a shooting scene; determine, as a reference image, one of the plurality of frame images, and determine, as non-reference images, remaining ones of the plurality of frame images other than the one determined as the reference image; perform a format conversion on the reference image and the non-reference images to obtain a format-converted reference image and format-converted non-reference images, and perform a noise addition processing on the format-converted reference image and each format-converted non-reference image respectively; align each noise-added non-reference image with a noise-added reference image to obtain an aligned non-reference image; annotate the format-converted reference image with pixel information to obtain a non-noise-added reference image; and acquire the sample image set, the sample image set including the aligned non-reference image, the noise-added reference image, and the non-noise-added reference image.

According to a third aspect of the embodiment of the present disclosure, a non-transitory computer-readable storage medium has stored thereon instructions that, when executed by a processor of a mobile terminal, cause the mobile terminal to perform a method for obtaining a sample image set. The method includes: acquiring a plurality of frame images continuously shot for a shooting scene; determining, as a reference image, one of the plurality of frame images, and determining, as non-reference images, remaining ones of the plurality of frame images other than the one determined as the reference image; performing a format conversion on the reference image and the non-reference images to obtain a format-converted reference image and format-converted non-reference images, and performing a noise addition processing on the format-converted reference image and each format-converted non-reference image respectively; aligning each noise-added non-reference image with a noise-added reference image to obtain an aligned non-reference image; annotating the format-converted reference image with pixel information to obtain a non-noise-added reference image; and acquiring the sample image set, the sample image set including the aligned non-reference image, the noise-added reference image, and the non-noise-added reference image.

It should be understood that the above general description and the following detailed description are only exemplary and explanatory, and do not limit the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Terms used in this disclosure are for the purpose of describing exemplary embodiments only and are not intended to limit the disclosure. For example, the terms "first," "second," "third" and the like may be adopted to describe various kinds of information in the present disclosure but the information may not be limited to these terms. These terms are only adopted to distinguish the same type of information. For example, without departing from the scope of the present disclosure, first information may also be referred to as second information, and similarly, second information may also be referred to as first information.

Figure 1:
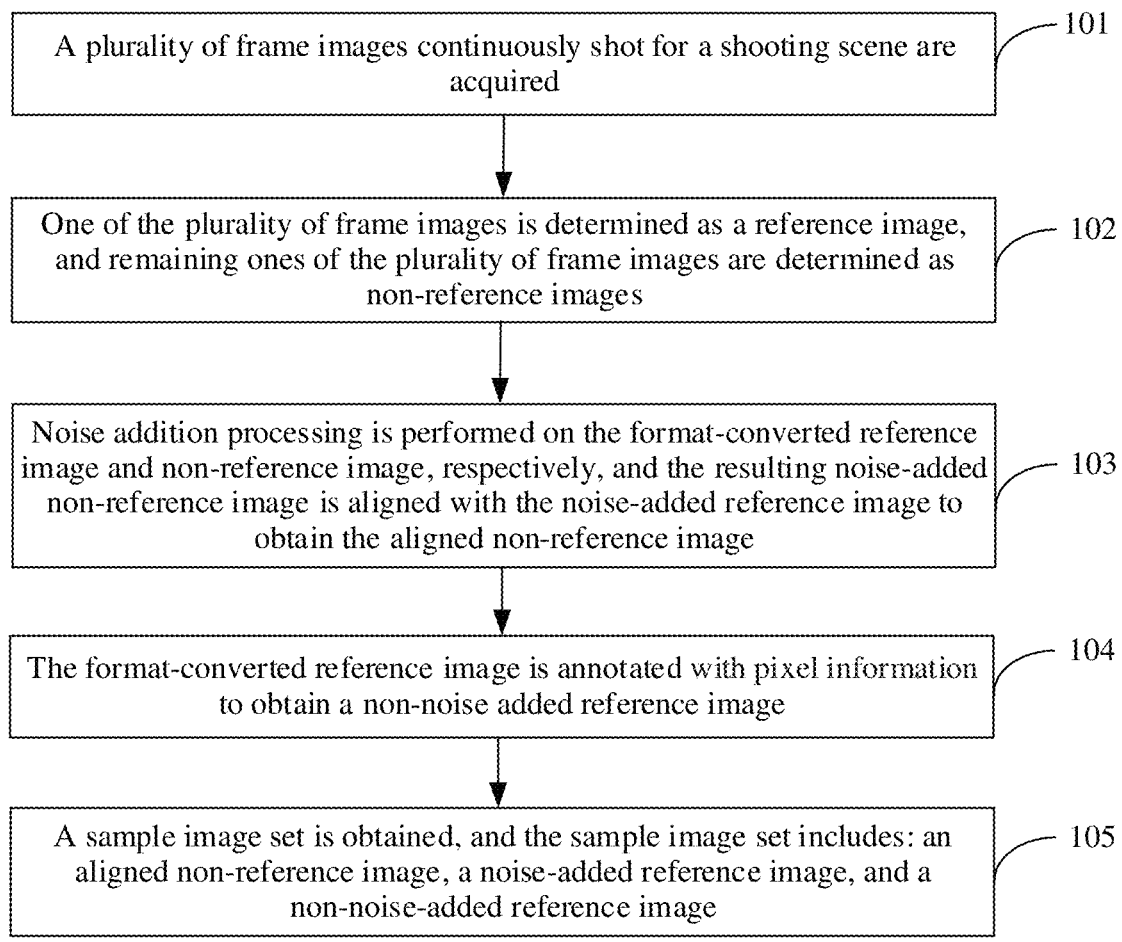
FIG. 1 is a flow chart of a method for acquiring a sample image set according to an exemplary embodiment.

FIG. 1 is a flowchart of a method for acquiring a sample image set according to an exemplary embodiment. The method may include the following steps.

In step 101, a plurality of frame images continuously shot for a shooting scene are acquired.

In an embodiment, the plurality of frame images continuously shot for a shooting scene are obtained by extracting consecutive frames from a video. The plurality of frame images in this step can all be RGB images.

In an embodiment, a high-definition (HD) video set with a resolution greater than 1080p and a bit rate greater than 1000 kbps is selected for scene detection, and a list $S_i = |(t_b^j, t_e^j)|_{j=1}^n$ is generated for each video $V_i$, where j is a complete scene number, $t_e^j$ is a positive integer greater than or equal to 1, $t_b^j$ is a start timestamp of a complete scene j, $t_e^j$ is an end timestamp of a complete scene j. A complete scene may correspond to one shot. When a shot cut occurs, the complete scene changes. For example, a scene cut has occurred and the complete scene has changed when switching from indoor shooting to outdoor shooting.

Assuming that a sampling scene is constructed from C frame images, for video $V_i$, the complete scene number is set to j=1, a sampling scene number is set to $b_k^i = 1$, and the frame count is set to $c^i = 0$.

The HD video $V_i$ is traversed. For each traversing of a frame $f^i$, the frame count $c^i$ is incremented by 1. If $c^i = C$, it is determined whether the traversed C frame images are all in a same complete scene. If the traversed C frame images are all in the same complete scene, the traversed C frame images are determined to be a multi-frame RGB image for a sampling scene, denoted as $b_k^i$ image, and the $b_k^i$ image is added to the sampling scene image set, and set $c^i = 0$, $b_{k+1}^i = b_k^i + 1$. If $c^i < C$, it then continues to traverse the next frame, the frame count $c^i$ is incremented by 1, that is, $c^i = c^i + 1$. Whether the C frame images are in the same complete scene can be determined as follows.

An interval between times when two adjacent frames of images are acquired is set to $cf^k$, which is calculated by a formula $cf^k = \text{ceil}(\text{randu}(0.02, 0.05) \times \text{fps}_i)$, where ceil ( ) is the upward rounding function, randu ( ) is a random coefficient that satisfies a uniform distribution, and $\text{fps}_i$ is the frame rate of $V_i$.

The acquisition time $t_1$ of the first frame image in the continuously traversed C frame images is determined, and the acquisition time $t_2$ of the Cth frame image in the continuously traversed C frame images is calculated, where $t_2 = t_1 + [(C-1) \times cf^k]$.

If $t_1 \geq t_b^j$ and $t_2 \leq t_e^j$, all the continuously traversed C frame images are determined to be in the complete scene j. If $t_2 > t_e^j$, the traversing of the image taken for the next complete scene is determined to have been started, and let j=j+1.

In this embodiment, acquiring a plurality of frame images continuously shot for one shooting scene may be understood as acquiring a plurality of frame images continuously shot for one sampling scene. In this embodiment, a plurality of frame images continuously shot for multiple sampling scenes can be obtained, the plurality of frame images continuously shot for each sampling scene can be processed according to the method for obtaining a sample image set provided in this embodiment to obtain a sample image subset corresponding to each sampling scene, and the sample image set can be obtained by collecting sample image subsets corresponding to multiple sampling scenes.

In step 102, one of the plurality of frame images is determined as a reference image, and remaining ones of the plurality of frame images are determined as non-reference images.

From the plurality of frame images, the one with the highest resolution can be determined as the reference image, and the remaining ones of the plurality of frame images can be determined as the non-reference images. When the plurality of frame images are all RGB images, the RGB image with the highest resolution is determined as a reference image, and the remaining RGB images in the plurality of frame images are determined as non-reference images.

In an embodiment, the reference image can be determined by $$f_b^r = \underset{r \in B}{\arg\max} \; \text{laplacian}(f_b)^2,$$

where b is a mark number of the shooting scene, $f_b^r$ is the reference image in the plurality of frame images continuously shot for the shooting scene b, B is a mark number set of the plurality of frame images continuously shot for the shooting scene b, laplacian ( ) is the Laplacian operator, and $f_b$ is an image of the plurality of frame images continuously shot for the shooting scene b. The $f_b$ corresponding to the largest laplacian$(f_b)^2$ is determined as $f_b^r$.

In step 103, noise addition processing is performed on a reference image and each non-reference image after format conversion (referred to hereafter as the format-converted reference image or non-reference image), respectively, and the resulting noise-added non-reference image is aligned with the noise-added reference image to obtain the aligned non-reference image.

When both the reference image and the non-reference images are RGB images, the image format of the reference image and the non-reference images can be converted to the RAW format, and then operations such as the noise addition processing can be performed on the reference image and the non-reference images in the RAW format.

In an embodiment, the reference image is sequentially subjected to an inverse global tone mapping transformation, an inverse gamma transformation and an inverse color space matrix transformation to obtain the transformed reference image, and the non-reference image is sequentially subjected to the inverse global tone mapping transformation, the inverse gamma transformation and the inverse color space matrix transformation to obtain the transformed non-reference image. Thereafter, the conversion of the image format is performed on the transformed reference image and the transformed non-reference image.

In an embodiment, for each frame image $f_b$ in the sampling scene $b_k^i$, $f_b \in R^{w_i \times h_i \times 3}$, where $w_i \times h_i$ is the resolution of the video $V_i$ and 3 is the number of color channels. Assuming that the global tone mapping is an S-shaped curve, the inverse global tone mapping transformation is performed on each frame image $f_b$ to obtain the image $f_b^1$, $f_b^1 = 0.5 \sin(\arcsin(1-2 \times f_b)/3)$. Each frame image $f_b$ is an RGB image.

The gamma transformation is performed on each frame $f_b^1$ to obtain the image $f_b^2$ from the standard non-linear RGB space to the standard linear RGB space, where $f_b^2 = \max(f_b^1, 1e-8)^{2.2}$.

For each frame $f_b^2$, $f_b^2$ is multiplied by the inverse of the randomly selected color space matrix to obtain an image $f_b^3$ converted from the standard linear RGB space to the sensor RGB space, where $f_b^3 = f_b^2 \times \text{inv}(CC[\text{in}_{cc}])$, inv ( ) is the function of inverting the matrix, CC ( ) is the color space matrix, $\text{in}_{cc}$ is the color space transformation matrix index, $\text{in}_{cc} = \text{randi}(0,7)$.

Figure 2:
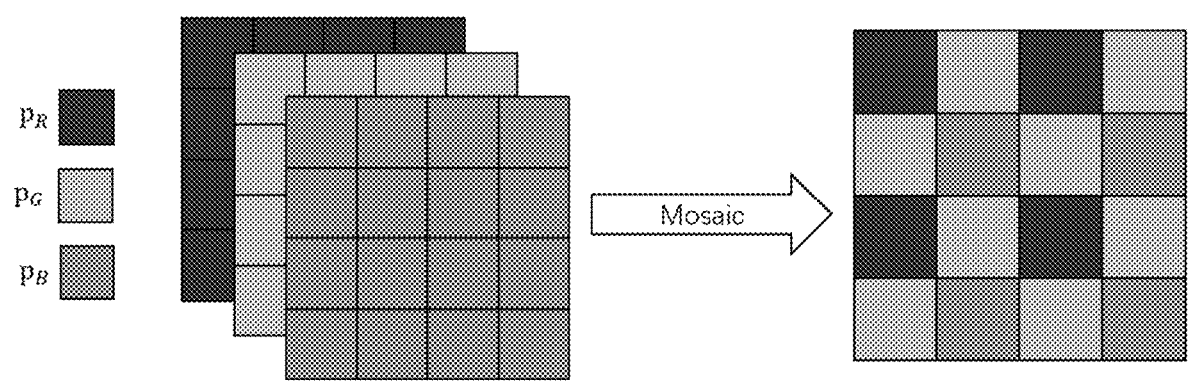
FIG. 2 is a schematic diagram of a mosaic transformation process according to an exemplary embodiment.

A mosaic transformation is performed on each frame $f_b^3$. For example, an image format conversion is performed to obtain a raw image $f_b^4$ in a Bayer format, $f_b^4 \in R^{w_i \times h_i \times 1}$, where $w_i \times h_i$ is the resolution of video $V_i$, and 1 is the number of color channels. The Mosaic transformation process is shown in FIG. 2. The raw image in the Bayer format is a raw image file generated by a Bayer filter type sensor.

For a terminal with a shooting function, such as a mobile phone, a set of color space transformation matrices is calibrated according to the phone model, e.g., as hardware performance. A sample image set can be constructed by choosing from a set of color space transformation matrices constructed in advance and randomly selecting a color space transformation matrix. An image de-noising model can be trained by the constructed sample image set and the RAW images taken by this model of mobile phone can be processed through the trained image de-noising model.

In an embodiment, the operation of adding noise to the format-converted reference image and the format-converted non-reference image can be implemented as follows. In a first step, the inverse image processing is performed on the format-converted reference image and the format-converted non-reference image respectively, the inverse image processing including: inverse white balance transformation, inverse vignetting transformation, and inverse digital gain transformation; in a second step, the noise addition processing is performed on the reference image and the non-reference image subjected to the inverse image processing.

For the first step described above, firstly, the format-converted reference image can be subjected to an inverse white balance transformation to obtain a first reference image, and the format-converted non-reference image can be subjected to the inverse white balance transformation to obtain a first non-reference image; secondly, for each pixel position in the first reference image, the pixel value of a pixel position is divided by the pixel value of the same pixel position in the target vignetting gain image to obtain the second reference image, and for each pixel position in the first non-reference image, the pixel value of a pixel position is divided by the pixel value of the same pixel position in the target vignetting gain image to obtain the second non-reference image; finally, the inverse digital gain transformation is performed on the second reference image and the second non-reference image, respectively.

Due to the inverse vignetting transformation, the effect of vignetting on the image is removed.

For a terminal with a shooting function, such as a mobile phone, a set of vignetting gain images is calibrated according to the model of the mobile phone, e.g., as hardware performance. When a sample image set is constructed, the target vignetting gain image can be randomly selected from a set of vignetting gain images constructed in advance.

A set of vignetting gain images $L = \{l_i\}_{i=1}^7$, $l \in R^{13 \times 14 \times 4}$, where the resolution of the vignetting gain image is enlarged from $13 \times 14 \times 4$ to $1500 \times 2000 \times 4$, the coordinates of each pixel in $l_i$ are multiplied by 125, the bilinear difference method is used to perform difference processing on each vignetting gain image, and then the Depth2space operation is used to change the resolution of the vignetting gain image to $3000 \times 4000$ to determine a set of vignetting gain image $\{l_i\}_{i=1}^7$, $l_i \in R^{3000 \times 4000}$, Depth2space is also called Depth to space. Depth2space processing is used to rearrange the depth data blocks into spatial data blocks.

In an embodiment, the inverse white balance transformation can be performed on each frame $f_b^4$. The pixel values of all R pixels in $f_b^4$ can be divided by $g_r$. The pixel values of all blue channels in $f_b^4$ can be divided by $g_b$, It is to obtain the RAW image subjected to the inverse white balance transformation, $f_b^5 = [p_R^5, p_G^4, p_B^5]$ where $p_G^4$ is the pixel value of the G pixel in $f_b^4$.

For example, $g_r = \text{randi}(1.5, 2.5)$, $g_b = \text{randi}(1.5, 2.0)$, randi ( ) is a random and uniformly distributed floating-point number.

The inverse vignetting transformation is performed on each frame $f_b^5$, to obtain $f_b^6 = f_b^5/l_b$, $l_b = \text{slice}(\acute{L}[\text{in}_l] \times s_l, w_l, h_l)$, where slice ( ) is a random crop function; $w_l$ is the starting coordinates for randomly cropping the vignetting gain image, $w_l = \text{randi}(0, (3000-w_i)/2)$, $w_i$ is the width of the video $V_i$; $h_l$ is the starting coordinates for randomly cropping the vignetting gain image, $h_l = \text{randi}(0, (4000-h_i)/2)$, $h_i$ is the height of the video $V_i$; $s_l$ is the coefficient that randomly perturbs the vignetting gain image, $s_l = \text{randn}(\mu=1, \sigma=0.075)$; randn ( ) is a function of random variables that satisfy the Gaussian distribution; $\acute{L}$( ) is the vignetting gain image; $\text{in}_l$ is the vignetting correction gain map index, $\text{in}_l = \text{randi}(0,7)$. $l_b$ is a slice image obtained by trimming a portion ranging from coordinates $(w_l, h_l)$ to coordinates $(w_l+w_i, h_l+h_i)$ in the vignetting gain image $\acute{L}[\text{in}_l]$.

The inverse digital gain transformation is performed on each frame $f_b^6$ to obtain $f_b^7 = f_b^6/g_{digital}$ and the reference image $f_b^{7r}$ is used as the ground-truth. $g_{digital}$ is a digital gain parameter, $g_{digital} = 1.0/\text{randn}(\mu=0.8, \sigma=0.1))$, and randn ( ) is a random variable function that satisfies the Gaussian distribution. $f_b^{7r}$ is an image obtained after the inverse digital gain transformation of the reference image. $f_b^{7r}$ is not subjected to noise addition processing, and $f_b^{7r}$ is referred to as a non-noise-added reference image.

A random Gaussian noise and a Poisson noise are added to each frame $f_b^7$ to obtain the noise-added image $f_b^n$, randn $(\mu=f_b^7, \sigma=\sqrt{f_b^7 \times \sigma_p + \sigma_g})$. $f_b^{7n}$ is a noise-added non-reference image, and $f_b^{7rn}$ is a noise-added reference image.

For example, randn ( ) is a random variable function that satisfies the Gaussian distribution; $\sigma_p$ is the strength of the added Poisson noise, $\sigma_p = \exp(\text{randu}(\log(0.0001), \log(0.012)))$, and $\sigma_g$ is strength of the added Gaussian noise, $\sigma_g = \exp(2.18 \times \log(\sigma_p) + 1.2 + \text{randn}(\mu=0, \sigma=0.26))$.

In an embodiment, the specific image in the noise-added non-reference image may be aligned with the specific image in the noise-added reference image.

For example, the optical flow diagram corresponding to the noise-added non-reference image may be determined based on the noise-added non-reference image and the noise-added reference image, and then the noise-added non-reference image and the noise-added reference image may be aligned according to the optical flow diagram. The optical flow diagram is used for moving image analysis.

Both the noise-added non-reference image and the noise-added reference image may be RAW images in a Bayer format. The above image alignment process can be implemented as follows. Firstly, a third non-reference image is obtained based on the average pixel value of each pixel unit in the noise-added non-reference image, and a third reference image is obtained based on the average pixel value of each pixel unit in the noise-added reference image, where each pixel unit includes one R pixel, two G pixels, and one B pixel; secondly, an offset vector of each pixel point image in the third non-reference image relative to a same pixel point image in the third reference image is determined, and an optical flow diagram is generated based on the offset vectors of all pixel points; then, the noise-added non-reference image is divided into an R channel image, a G1 channel image, a G2 channel image and a B channel image; finally, the pixel point image in each channel image is moved based on the optical flow diagram, and the four channel images subjected to the pixel point image movement are combined.

When the number of noise-added non-reference images is more than one, for each frame of noise-added non-reference image, the above four-step operation may be performed to align the frame of noise-added non-reference image with the noise-added reference image.

In the embodiment, an optical flow alignment method is used, which can achieve accurate alignment of images.

In an embodiment, $f_b^{7n}$ is a noise added non reference image, $f_b^{7rn}$ a noise-added reference image, and $f_b^{7n}$ and $f_b^{7rn}$ are both RAW images in the Bayer format. $f_b^{7n}$ is aligned with $f_b^{7rn}$ obtain the aligned $f_b^{7n}$, which is the aligned frame $f_b^{7a}$, and to obtain the optical flow diagram $m_b^{7a}$ corresponding to the aligned frame $f_b^{7a}$, where $m_b^{7a}$=align($f_b^{7n}$, $f_b^{7rn}$). An exemplary alignment process is as follows.

The average pixel value of each pixel unit in $f_b^{7n}$ is calculated to obtain $fg_b^{7n}$, $fg_b^{7n}=(p_R^{7n}+p_{G1}^{7n}+p_{G2}^{7n}+p_B^{7n})/4$, and the average pixel value of each pixel unit in each $f_b^{7r}$ is calculated to obtain $fg_b^{7rn}$, $fg_b^{7rn}=(p_R^{7rn}+p_{G1}^{7rn}+p_{G2}^{7rn}+p_B^{7rn})/4$, where $P_R$ is the pixel value of the R pixel, $p_{G1}$ is the pixel value of the pixel G1, $p_{G2}$ is the pixel value of the G2 pixel, and $p_B$ is the pixel value of the B pixel.

The offset vector of each pixel point image in $fg_b^{7n}$ relative to a same image in $fg_b^{7rn}$ is determined, where the offset vector includes an offset vector u in the horizontal direction and an offset vector v in the vertical direction. The optical flow diagram $m_b^{7a}$ is then generated based on the offset vectors of all pixel points, $m_b^{7a}=\{(u, v)\}$.

$f_b^{7n}$ is divided into four channel images $f_r^{7n}$, $f_{g1}^{7n}$, $f_{g2}^{7n}$, and $f_b^{7n}$. For each channel image, an image at a pixel point (i, j) in the channel image is mapped to a position (i+u, j+v) using the optical flow diagram $m_b^{7a}$ to achieve alignment of the non-reference image to the reference image, thereby obtaining the aligned non-reference image.

In an embodiment, after the noise-added reference image is obtained, the noise strength graph $np_b^{7rn}$ of the noise-added reference image can be determined by the following formula: $np_b^{7rn}=f_b^{7rn}\times\sigma_p+\sigma_g$, where $f_b^{7rn}$ is the noise-added reference image, $\sigma_p$ is the strength of the added Poisson noise, and $\sigma_g$ is the strength of the added Gaussian noise.

In an embodiment, in addition to the Disflow alignment method, other alignment methods can also be used for image alignment, for example, a global alignment method based on Harris features.

In step 104, the format-converted reference image is annotated with pixel information to obtain a non-noise-added reference image.

When the reference image is an RGB image, the image format of the reference image can be converted to the RAW format, and the reference image in the RAW format can then be annotated with pixel information. Since the annotated image is not subjected to noise addition operation, the annotated image is called a non-noise-added reference image.

The pixel information may be a pixel matrix, the pixel matrix including pixel values of different pixel points.

In step 105, a sample image set is obtained, which includes: an aligned non-reference image, a noise-added reference image, and a non-noise-added reference image.

The images in the sample image set are all sample images, and the sample image set is used to train the image de-noising model, thereby optimizing the image de-noising model.

In an embodiment, after generating the optical flow diagram of the third non-reference image based on the offset vector of each pixel point image in the third non-reference image, the acquired sample image set may further include the optical flow diagram of the aligned non-reference image.

The sample image set may further include a noise strength diagram $np_b^{7rn}$ and partial metadata information $D_k$, and $D_k$ may include $g_r$, $g_b$, $g_{digital}$, CC [$in_{cc}$], and $l_1$.

For example, when there are multiple sampling scenes, the sample image set includes a sample image subset corresponding to each sampling scene, and the sample image subset includes $f_b^{7r}$, $\{f_b^{7a}\}$, $\{m_b^{7a}\}$, $f_b^{7rn}$, $np_b^{7rn}$, and $D_k$.

In the embodiment of the present disclosure, multiple frame images continuously shot for a shooting scene are used as the data source of the sample image set of the image de-noising model. Based on the multiple frame images, a new type of sample image set is obtained, the sample image set includes aligned non-reference images, noise-added reference image, and non-noise-added reference image.

An embodiment of the present disclosure also provides a method for training an image de-noising model. The image de-noising model is used to de-noise a fusion image of multiple frames of images continuously shot by a camera. The image de-noising model includes a first module and a second module. In the embodiment of the present disclosure, the sample image set provided above is used to train the image de-noising model.

Figure 3:
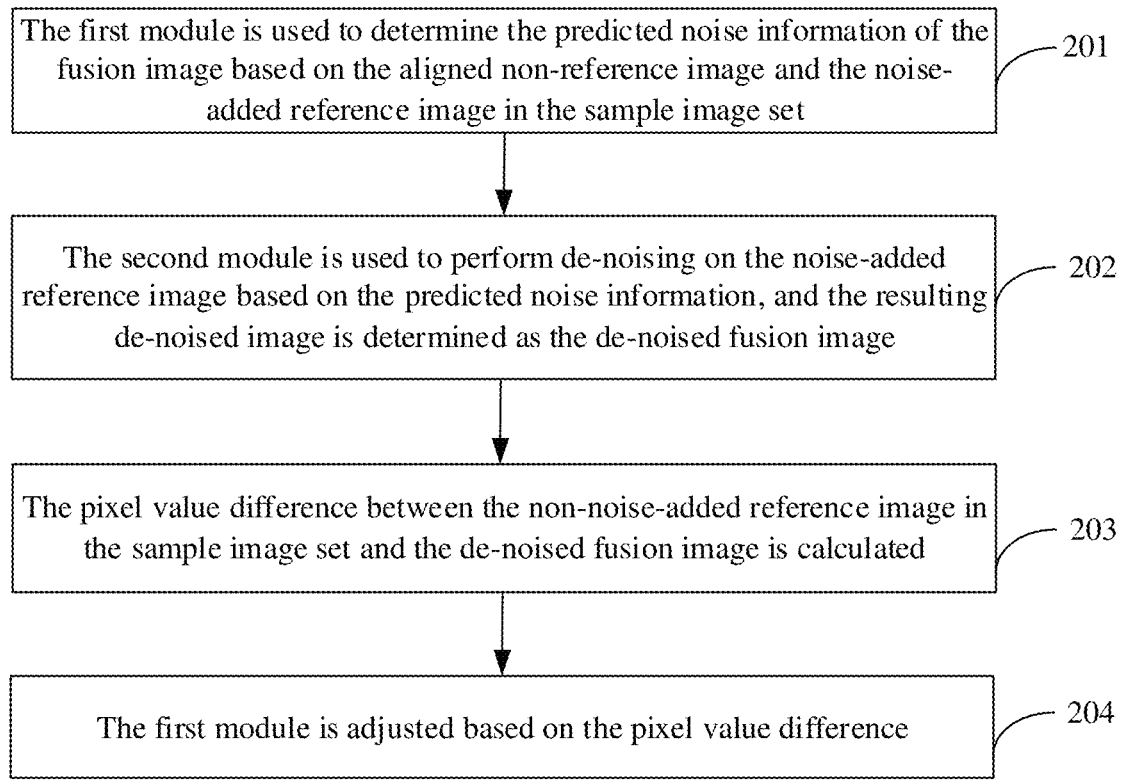
FIG. 3 is a flowchart of a method for training an image de-noising model according to an exemplary embodiment.

FIG. 3 is a flowchart of a method for training an image de-noising model according to an exemplary embodiment. The method may include the following steps.

In step 201, the first module is used to determine the predicted noise information of a fusion image based on the aligned non-reference image and the noise-added reference image in the sample image set.

The fusion image is an image obtained by fusing the aligned non-reference image and the noise-added reference image. The fusion image corresponds to the noise-added reference image, and the fusion image is closer to the noise-added reference image.

In an embodiment, the images in the sample image set are all RAW images in the Bayer format; the first module in the image de-noising model includes: a first sub-module and a second sub-module. Under this structure, step 201 can be achieved as follows. Firstly, the first sub-module is used to perform the Space2depth (Space to depth) processing on the noise-added reference image and the aligned non-reference image to obtain the processed reference image and the processed non-reference image; secondly, second sub-module is used to determine the predicted noise information of the fusion image based on the processed reference image and the processed non-reference image. Space2depth is also known as Space to depth. Space2depth processing is used to rearrange spatial data blocks into depth data blocks.

In an embodiment, the second sub-module may include an input unit, a plurality of encoding units, a fusion unit, a plurality of decoding units, and an output unit, where each encoding unit includes an encoding sub-unit and a first sampling sub-unit, each decoding unit includes a decoding sub-unit and a second sampling sub-unit, and the decoding sub-unit included in each decoding unit is connected to at least two first sampling sub-units.

Under this structure, the operation of determining the predicted noise information of the fusion image based on the processed reference image and the processed non-reference image can be achieved as follows.

In a first step, the input unit is used to adjust the number of channels of the processed reference image and the processed non-reference image to obtain a first feature image. A feature image may also be referred to as a characteristic image.

In a second step, the plurality encoding units are used to perform encoding processing and sampling processing on the first feature image to obtain a second feature image and a first sampling feature image obtained by each first sampling sub-unit.

In a third step, a fusion unit is used to perform feature fusion processing on the second feature image to obtain a third feature image.

In a fourth step, a plurality of decoding units are used to perform sampling processing and decoding processing on the third feature image to obtain a fourth feature image, where the second sample feature image obtained by the second sampling sub-unit in each decoding is merged by the second sampling sub-unit with a target sampling feature image, which is the first sampling feature image obtained by the first sampling sub-unit connected to the second sampling sub-unit.

In a fifth step, the output unit is used to determine the noise information of the fourth feature image, and the noise information of the fourth feature image is determined as the predicted noise information of the fusion image.

The second sub-module in this embodiment is obtained by using the Unet network as the backbone network with certain improvements. The one-to-one connections between the encoding modules and the decoding modules in the Unet network are expanded to dense connections, which improves the accuracy of the second sub-module in determining the predicted noise information of the fusion image.

In step 202, the second module is used to perform de-noising on the noise-added reference image based on the predicted noise information, and the resulting de-noised image is determined as the de-noised fusion image.

In step 203, a pixel value difference between the non-noise-added reference image in the sample image set and the de-noised fusion image is calculated.

In an embodiment, the non-noise-added reference image and the fusion image after de-noising are subjected to digital gain enhancement processing and vignetting correction processing, respectively. The pixel value difference between the reference image and the fusion image subjected to the digital gain enhancement processing and vignetting correction processing is calculated.

Adding the digital gain enhancement processing and the vignetting correction processing operations makes the noise distributions of the training images and test images closer, thereby improving the de-noising ability of the image de-noising model.

In some embodiments, in the first step, the pixel value of each pixel in the non-noise-added reference image is multiplied with the target digital gain, and each pixel value of the reference image subjected to multiplication is multiplied with the pixel value at the same pixel position in the target vignetting gain image. In the second step, the pixel value of each pixel in the de-noised fusion image is multiplied with the target digital gain, and each pixel value in the fusion image subjected to multiplication is multiplied with the pixel value at a same pixel position in the target vignetting gain image, where the target digital gain is a digital gain used in inverse vignetting during acquisition of the sample image set, and the target vignetting gain image is a vignetting gain image used in inverse digital gain transformation during the acquisition of the sample image set.

In step 204, the first module is adjusted based on the pixel value difference.

There are various adjustment methods. For example, the first module may be adjusted based on the difference in pixel values, so that the difference in pixel values is less than a preset value, and the preset value is relatively small, preferably zero. The first module may also be adjusted based on the difference in pixel values and when the number of adjustments reaches a preset number, the adjustment ends.

The embodiments of the present disclosure use a new type of sample image set to train the image de-noising model. The ability of image de-noising model to analyze the texture details of an image and to remove image ghosts, and the quality of the image output by the noise model can be improved based on the types of images in the sample image set.

The ability of the image de-noising model to analyze the image texture details and the ability to remove image ghosts are further improved based on the optical flow diagram alignment method used in the embodiments of the present disclosure, thereby enabling the image output by the image de-noising model to have a better texture details and preventing occurrence of image ghosts The following examples illustrate the image de-noising model and the method of training the image de-noising model.

The structure and de-noising performance of the image de-noising model are described below.

The image de-noising model provided in this example is obtained by using the Unet network as the backbone network and making certain improvements. Compared with the traditional Unet network, in this example, the bottleneck residual module in Resnet is added to each encoding module and decoding module in the de-noising model, and the one-to-one connections between the encoding modules and the decoding modules in the Unet network are expanded into dense connections.

Figure 4:
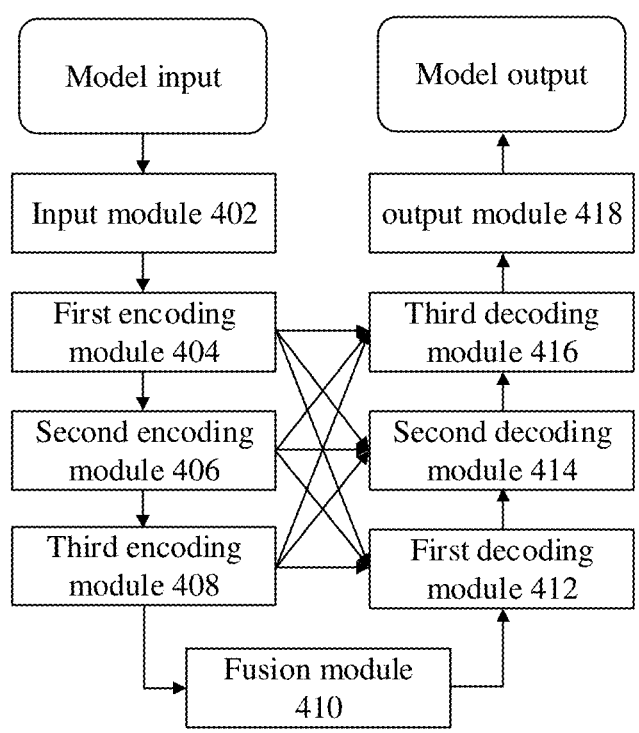
FIG. 4 is a schematic diagram of an image de-noising model according to an exemplary embodiment.

FIG. 4 is a schematic diagram of an image de-noising model according to an exemplary embodiment. Referring to FIG. 4, the image de-noising model $F(I_t, \theta)$ includes an input module 402, first, second, and third encoding modules 404, 406, 408, a fusion module 410, first, second, and third decoding modules 412, 414, 416, and an output module 418, where $\theta$ is the model parameter of the image de-noising model, and the three encoding modules 404, 406, 408 are respectively connected to the three decoding modules 412, 414, 416.

The input module 402 and the output module 418 are composed of convolutional networks. For example, the number of channels, the size of the convolution kernel, the step size, the activation function, and whether there are offsets in the input module 402 and the output module 418 are shown in Table 1.

TABLE 1

Convolution Network Parameters

| Module | Type | Number of Channels | Convolution Kernel Size | Step Size | Activation Function | Offset |
|---|---|---|---|---|---|---|
| Input module | Convolution | 64 | 3 | 1 | relu | 0 |
| Output module | Convolution | 4 | 3 | 1 | — | 1 |

Figure 5:
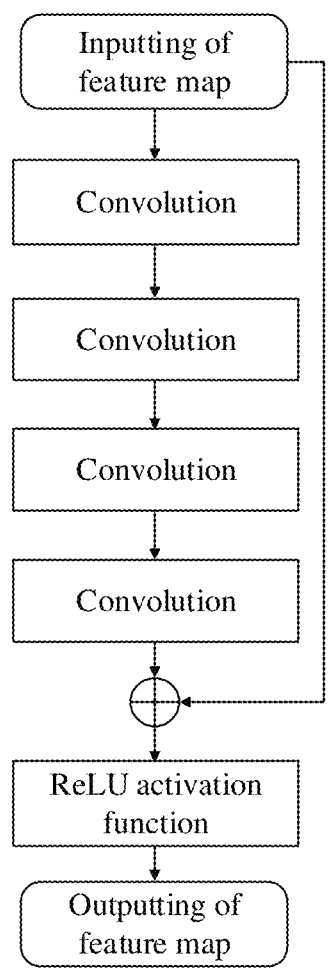
FIG. 5 is a schematic diagram of a residual sub-module according to an exemplary embodiment.

Each encoding module includes a residual sub-module and a sampling sub-module, and each decoding module includes a residual sub-module, a merging sub-module, and a sampling sub-module. The structure of the residual sub-module is shown in FIG. 5. The parameters such as the number of channels, the size of the convolution kernel, the step size, the activation function, and whether there are offsets in the residual sub-module are shown in Table 2. In Table 2, c is the number of channels of the first convolution layer in the residual sub-module, and the size of c can be set as needed. In this example, c is set to 64. The sampling sub-module uniformly uses the space2depth operation for downsampling and uniformly uses the depth2space operation for up sampling.

TABLE 2

Convolution Network Parameters

| Number | Type | Number of Channels | Convolution Kernel Size | Step Size | Activation Function | Offset |
|---|---|---|---|---|---|---|
| 1 | Convolution | c | 1 | 1 | — | 1 |
| 2 | Convolution | c/4 | 1 | 1 | relu | 0 |
| 3 | Convolution | c/4 | 3 | 1 | relu | 0 |
| 4 | Convolution | c | 1 | 1 | — | 0 |

The input of the input module 402 is $I_i$ and the output is $f_0$. The input module 402 is used to adjust the number of channels of the image in $I_i$. For example, $I_i$ includes 8 frames of images, and each frame image is obtained after Space2depth processing. Each frame image includes 4 channels of images. includes 32 channels of images in total. The number of channels of images in is 32. The number of image channels in $f_0$ is 64 after being processed by the input module 402.

The input of the first encoding module 404 is $f_0$. The residual sub-module in the first encoding module 404 is used to process $f_0$ to obtain $f_1$, and the sampling sub-module in the first encoding module 404 is used to perform 2-times space2depth downsampling on $f_1$ to obtain $f_{11}$, and to perform 4-times space2depth downsampling processing on $f_1$ to obtain $f_{12}$.

The input of the second encoding module 406 is $f_{11}$. The residual sub-module in the second encoding module 406 is used to process $f_{11}$ to obtain $f_2$, and the sampling sub-module in the second encoding module 406 is used to perform 2-times space2depth downsampling on $f_2$ to obtain $f_{21}$, and to perform 2-times depth2space upsampling on $f_2$ to obtain $f_{22}$.

The input of the third encoding module 408 is $f_{21}$, the residual sub-module in the third encoding module 408 is used to process $f_{21}$ to obtain $f_3$, and the sampling sub-module in the third encoding module 408 is used to perform 2-times depth2space upsampling on $f_3$ to obtain $f_{31}$, and to perform 4-times depth2space upsampling processing on $f_3$ to obtain $f_{32}$.

The fusion module 410 is composed of residual sub-modules, where the input of the fusion module 410 is $f_3$, and the output of the fusion module 410 is $f_4$.

The input of the first decoding module 412 is $f_4$, and the sampling sub-module in the first decoding module 412 is used to perform 2-times depth2space upsampling on $f_4$ to obtain $f_5$, and the merge sub-module in the first decoding module 412 is used to merge $f_5$, $f_3$ and $f_{12}$ with $f_{21}$ to obtain $f'_1$, and the residual sub-module in the first decoding module 412 is used to process $f'_1$ to obtain $f_{51}$. The merge sub-module merges images with the same length and width, and adds up the number of channels.

The input of the second decoding module 414 is $f_{51}$. The sampling sub-module in the second decoding module 414 is used to perform 2-times depth2space upsampling on $f_{51}$ to obtain $f_6$. The merge sub-module in the second decoding module 414 is used to merge $f_6$, $f_{31}$ and $f_2$ with $f_{11}$ to obtain $f'_2$, and the residual sub-module in the second decoding module 414 is used to process $f'_2$ to obtain $f_{61}$.

The input of the third decoding module 416 is $f_{61}$. The sampling sub-module in the third decoding module 416 is used to perform 2-times depth2space upsampling on $f_{61}$ to obtain $f_7$. The merge sub-module in the third decoding module 416 is used to merge $f_7$, $f_{32}$, $f_{22}$ with $f_1$ to obtain $f'_3$, and the residual sub-module in the third decoding module 416 is used to process $f'_3$ to obtain $f_{71}$, where $f_{71}$ is the fusion image.

The input of the output module 418 is $f_{71}$, and the output is $l''_i$. $l''_i$ is the predicted noise information of the fusion image.

In an embodiment, the amount of parameters of the convolution kernel in the image de-noising model can be reduced, and c can be set to a smaller value in the residual sub-module, thereby reducing the overall calculation scale of the model and increasing the processing speed of the model.

For example, the number of channels of the image output by the residual sub-module in the first encoding module 404 may be preset to 64, the number of channels of the image output by the residual sub-module in the second encoding module 406 may be preset to 128, and the number of channels of the image output by the residual sub-module in the third encoding module 408 may be preset to 256. The number of channels of the image output by the fusion module 410 may be preset to 256. The number of channels of the image output by the residual sub-module in the first decoding module 412 may be preset to 256. The number of channels of the image output by the residual sub-module in the second decoding module 414 may be preset to 128. The number of channels of the image output by the residual sub-module in the third decoding module 416 may be preset to 64.

In this example, a residual module and dense connections are added to the image de-noising model, thereby improving the de-noising analysis ability of the image de-noising model and network depth, avoiding the problem of gradient disappearance, and effectively improving the generalization ability of the image de-noising model.

In this example, ablation experiments are performed on the traditional Unet model with mid channel being 64, the image de-noising model (also called DenseResUnet model) provided by the example, the ResUnet model, and the DenseUnet model. The DenseResUnet model includes residual sub-modules and has dense connections. The ResUnet model is a model obtained by changing the dense connections in the DenseResUnet model to one-to-one connections. The DenseUnet model is a model obtained after canceling the residual sub-module in the DenseResUnet model.

5 frame images in the sample image set are selected as the test set to test the traditional Unet model, the DenseResUnet model, the ResUnet model and the DenseUnet model. The test results are shown in Table 3.

TABLE 3

Ablation Experiment Data

|  | Noise Graph | Unet | DenseResUnet | ResUnet | DenseUnet |
|---|---|---|---|---|---|
| pSNR | 35.18 | 42.82 | 43.41 | 43.09 | 42.94 |
| pSNR_gain | 0 | +7.64 | +8.23 | +7.91 | +7.76 | pSNR is called Peak Signal to Noise Ratio, also known as Peak Signal to Noise Ratio.

It can be seen from Table 3 that the image de-noising model provided in this example has the highest pSNR, indicating that the image de-noising model provided in this example has the best de-noising effect.

The following describes the training process of the image de-noising model.

The sample image set T includes a plurality of sample image subsets $P_i$, where different shooting scenes correspond to different sample image subsets $P_i$, or different sampling scenes correspond to different sample image subsets $P_i$, where $P_i$ includes $f_b^{7r}$, $\{f_b^{7a}\} np_b^{7r}$.

For each $P_i$, $P_i=\{(f_b^{7r}, \{f_b^{7a}\}, \{m_b^{7a}\}, f_b^{7m}, np_b^{7m}, D_k)\}$, Space2depth operation is performed on $f_b^{7m}$, $\{f_b^{7a}\}$ and $np_b^{7m}$ respectively to obtain $f_b^{7mp}$, $\{f_b^{7ap}\}$ and $np_b^{7rp}$ in turn, and obtain the input $I_i$ of the image de-noising model, where I=concate($f_b^{7mp}$, $\{f_b^{7ap}\}$, $np_b^{7mp}$, $\{m_b^{7a}\}$). The input $I_i$ is then input into the image de-noising model.

Figure 6:
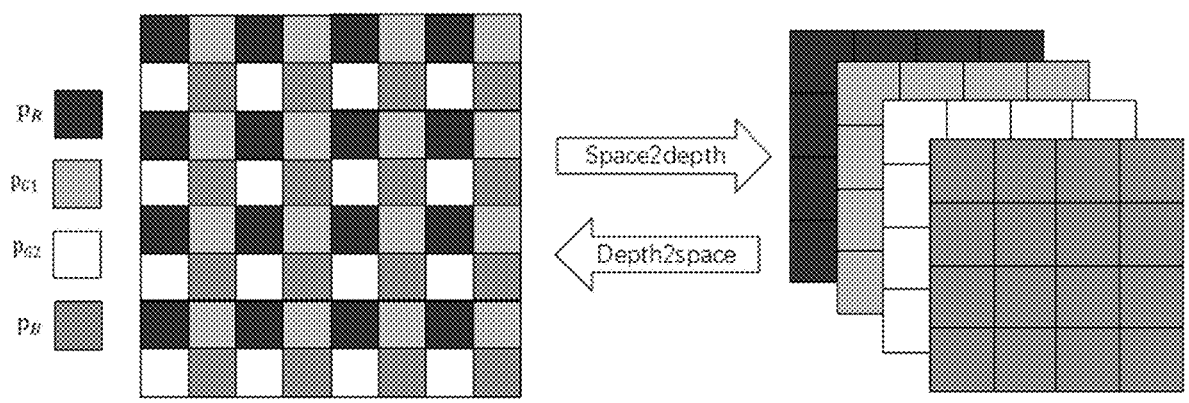
FIG. 6 is a schematic diagram of a Depth2space operation process according to an exemplary embodiment.

The process of Space2depth operation is shown in FIG. 6.

$I_i''=F(I_i, \theta)$ output from the image de-noising model is obtained, where $\theta$ is the model parameter of the image de-noising model. Depth2space operation is performed on $I_i''$ to obtain $I'_i{}''$, based on the theory of residual learning, $f_b^{7m}-I'_i{}''=I_i^o$ is calculated, and $I_i^o$ is used as the de-noised fusion image. The fusion image is an RAW image.

Using $D_k$, $g_r$, $g_b$, $g_{digital}$, CC[$in_{cc}$], $l_b$), image formats of the de-noised fusion image $I_i^o$ and the non-noise-added reference image $f_b^{7r}$ are converted to the RGB format respectively through a simulated image processing process. The pixel value difference between $f_b^{7r}$ in the RGB format and $I_i^o$ in the RGB format is calculated. This pixel value difference can be referred to as a loss L1.

The loss L1 is used to adjust the image de-noising model to reduce the difference in pixel values between $f_b^{7r}$ and $I_i^o$.

Since the operations performed on $I_i^o$ and $f_b^{7r}$ are the same, $I_i^o$ is used as an example to describe the above process.

In step 1, digital gain enhancement is performed on $I_i^o$ to obtain $I_i^{o1}$, where $I_i^{o1}=I_i^o \times g_{digital}$.

In step 2, a vignetting correction operation is performed on $I_i^{o1}$ subjected to the digital gain enhancement to obtain $I_i^{o2}$, where $I_i^{o2}=I_i^{o1} \times l_b$.

In step 3, white balance transformation is performed on the $I_i^{o2}$ subjected to the vignetting correction, the pixel values of all R pixels in $I_i^{o2}$ are multiplied by $g_R$ to obtain $p_R^{o3}$, where $p_R^{o3}=p_R^{o2} \times g_R$, $p_R^{o2} \in I_i^{o2}$. The pixel values of all B pixels in $I_i^{o2}$ are multiplied by $g_B$ to obtain $p_B^{o3}$, $p_B^{o3}=p_B^{o2} \times g_B$, $p_B^{o2} \in I_i^{o2}$, and the RAW image $I_i^{o3}$ subjected to the white balance transformation, $I_i^{o3}=\{p_R^{o3}, p_G^{o2}, p_B^{o3}\}$, where $p_G^{o2} \in I_i^{o2}$ is the pixel value of the G pixel in $I_i^{o2}$.

In step 4, the Space2depth convolution operation is performed on $I_i^{o3}$ to generate four 2-times down-sampled channel images [$I_{iR}^{o3}$, $I_{iG1}^{o3}$, $I_{iG2}^{o3}$, $I_{iB}^{o3}$]. Bi-linear interpolation based demosaic operation is performed on the four channel images to obtain an image $I_i^{o4}$ in a sensor space RGB format.

For example, 2-times upsampling based on bi-linear interpolation is performed on the red channel to obtain $I_{iR}^{o4}$=bilinear ($I_{iR}^{o3}$, 2).

After the blue channel is flipped upside down, 2-times upsampling based on bi-linear interpolation is performed, and then the blue channel is flipped upside down again to obtain $I_{iB}^{o4}$=flip_undown(bilinear(flip_undown($I_{iB}^{o3}$),2)).

After the first green channel is left-right reversed, 2-times upsampling based on bilinear interpolation is performed, and then first green channel is left-right reversed again to obtain $I_{iG1}^{o4}$=flip_leftright(bilinear(flip_leftright($I_{iG1}^{o3}$),2)).

After the second green channel is flipped upside down, 2-times upsampling based on bilinear interpolation is performed, and then second green channel is flipped upside down again to obtain $I_{iG2}^{o4}$=flip_undown(bilinear(flip_undown($I_{iG2}^{o2}$),2)).

$I_{iG1}^{o4}$ and $I_{iG2}^{o4}$ are merged to obtain $I_{iG}^{o4}$. For any pixel $p_G^{o4} \in I_{iG}^{o4}$, if the pixel in $I_i^{o3}$ with same coordinates as $P_{iG}^{o4}$ is classified into $I_{iG1}^{o3}$ through Space2depth, then the pixel value $p_G^{o4}$ of pixel $P_{iG}^{o4}$ is the pixel value of pixel $I_{iG1}^{o4}$ with the same coordinates, that is, $p_G^{o4}=p_{G1}^{o4}$, $p_{G1}^{o4} \in I_{iG1}^{o4}$. If the pixels in $I_i^{o3}$ with same coordinates as $P_{iG}^{o4}$ are classified into $I_{iG2}^{o3}$ through Space2depth, then the pixel value $p_G^{o4}$ of the pixel $P_{iG}^{o4}$ is the pixel value of the pixel with the same coordinates in $I_{iG2}^{o4}$, that is, $p_G^{o4}=p_{G2}^{o4}$, $p_{G2}^{o4} \in I_{iG2}^{o4}$. Otherwise, the pixel value of the pixel $P_{iG}^{o4}$ is $p_G^{o4}=(p_{G1}^{o4}+p_{G2}^{o4})/2$.

An image in RGB format is generated, $I_i^{o4}=[I_{iR}^{o4}, I_{iG}^{o4}, I_{iB}^{o4}]$.

In step 5, color space transformation is performed on $I_i^{o4}$ to obtain an image $I_i^{o5}$ converted from the sensor RGB space to the standard linear RGB space, where $I_i^{o5}=I_i^{o4} \times CC$ [$in_{cc}$].

In step 6, a gamma transformation is performed on $I_i^{o5}$ to obtain an image $I_i^{o6}$ converted from the standard linear RGB space to the standard non-linear RGB space, $$I_i^{0.6} = \max(I_i^{0.5}, 1e-8)^{\frac{1}{2.2}}.$$

The above steps 1 to 6 are performed on $f_b^{7r}$ to obtain $f_b^{7r6}$.

The loss $L_1=|f_b^{7r6}-I_i^{o6}|$ between $f_b^{7r6}$ and $I_i^{o6}$ is calculated.

In some embodiments, the Adam optimizer is used to perform reverse optimization on $L_1$, and the parameters of the Adam optimizer are set to the default values: σ=0.1, β_1=0.9, β_2=0.999.

In some embodiments, the training batch size is set to 16; the image block size is set to 256, the training period is set to 200 cycles of training set with the learning rate for first 150 cycles being set to 1e$^{-4}$ and the learning rate for last 50 cycles being set to 1e$^{-5}$.

In the embodiments of the present disclosure, a new type of sample image set is used to train the image de-noising model based on the types of images in the sample image set. As a result, the trained image de-noising model can output a high-quality de-noised fusion image, and the output fusion image can have good texture details with no ghosting problems.

Figure 7:
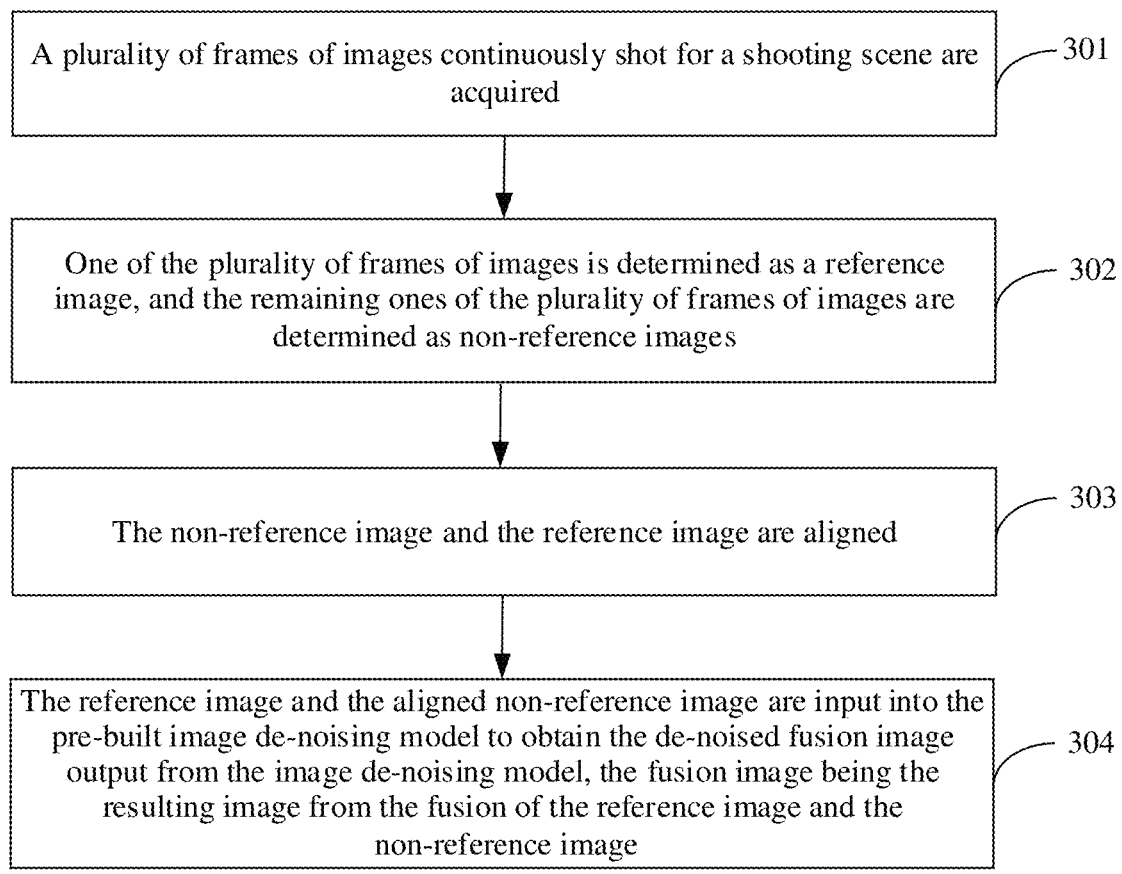
FIG. 7 is a flowchart of an image de-noising method according to an exemplary embodiment.

Embodiment of the present disclosure also provide an image de-noising method, which performs image de-noising based on the image de-noising model provided by the above embodiment of the present disclosure. FIG. 7 is a flowchart of an image de-noising method according to an exemplary embodiment. The method includes:

In step 301, a plurality of frame images continuously shot for a shooting scene are acquired.

In the embodiment, the plurality of frame images continuously shot for a shooting scene may be the plurality of frame images continuously shot after the camera shutter is pressed. The plurality of frame images in this step can all be RAW images.

In step 302, one of the plurality of frame images is determined as a reference image, and the remaining ones of the plurality of frame images are determined as non-reference images.

When the plurality of frame images are all RAW images, one RAW frame of the image in the plurality of frames of RAW images is determined as a reference image, and the remaining plurality of RAW images are determined as non-reference images.

In an embodiment, the image with a highest definition among the multiple frame images may be determined as the reference image.

In step 303, the non-reference image and the reference image are aligned.

In an embodiment, the optical flow diagram corresponding to the non-reference image may be determined based on the non-reference image and the reference image, and then the non-reference image and the reference image may be aligned according to the optical flow diagram.

In some embodiments, both the non-reference image and the reference image are RAW images in Bayer format, and image alignment can be achieved as follows.

Firstly, based on the average pixel value of each pixel unit in the non-reference image, the target non-reference image is obtained, and based on the average pixel value of each pixel unit in the reference image, the target reference image is obtained. Each pixel unit includes one R pixel, two G pixels and one B pixel.

Secondly, each pixel point image in the target non-reference image is determined.

An offset vector relative to a same image in the target reference image is determined. The optical flow diagram is generated based on the offset vectors of all pixel points.

Then, the non-reference image is split into an R channel image, a G1 channel image, a G2 channel image and a B channel image.

Finally, the pixel point image in each channel image is moved according to the optical flow diagram, and the four channel images subjected to the pixel point image movement are combined. Thus, the aligned non-reference image is obtained.

If there are multiple non-reference images, the above four steps are performed for each frame of non-reference image to achieve alignment of each frame of non-reference image.

The alignment method provided in the embodiments of the present disclosure may be referred to as an optical flow alignment method.

In step 304, the reference image and the aligned non-reference image are input into the pre-built image de-noising model to obtain the de-noised fusion image output from the image de-noising model. The fusion image is the resulting image from the fusion of the reference image and the non-reference image.

In an embodiment, if the above optical flow alignment method is used for image alignment, the optical flow diagram corresponding to the non-reference image may also be input to the image de-noising model when the reference image and the aligned non-reference image are input to the image de-noising model, so that the image de-noising model performs image de-noising based on the reference image, the aligned non-reference image and the optical flow diagram, and output a high-quality fusion image.

The image de-noising method provided by the embodiment is illustrated by the following example.

In this example, a set of RAW images is acquired that is collected when the camera shutter is pressed. A defective pixel correction operation is performed on the RAW images. Reference images and non-reference images are selected from the corrected RAW images. The non-reference images are aligned with the reference images. Reference images and the aligned non-reference images are then input into the image de-noising model in the embodiment of the present disclosure to obtain the de-noised fusion image output from the image de-noising model. The fusion image is the resulting image from fusing the reference image and the aligned non-reference image. The image de-noising process includes:

The camera sensor outputs N frames of RAW images, and N frames of RAW images form an image set $B_t$, $B_t=|f_t^i|_{i=1}^N$.

In step 1, a defective pixel correction is performed on each frame $f_t^i$ in $B_t$.

Space2depth convolution operation is performed on each frame $f_t^i$ in $B_t$ to generate four 2-times down-sampled channel images $[f_{tR}^i, f_{tG1}^i, f_{tG2}^i, f_{tB}^i]$; for each pixel $p_t^i$ in each channel image, the set of eight adjacent pixels $Q_t^i$ are compared, and the updated pixel value is $p_t^{1i}=\min(\max(p_t^i, \min(Q_t^i)), \max(p_t^i, \min(Q_t^i)))$, thereby generating $[f_{tR}^{1i}, f_{tG1}^{1i}, f_{tG2}^{1i}, f_{tB}^{1i}]$. $f_t^{1i}$ is generated through Depth2space operation performed on $[f_{tR}^{1i}, f_{tG1}^{1i}, f_{tG2}^{1i}, f_{tB}^{1i}]$.

Adding the detection of defective pixels makes the noise distributions of the training and test RAW images closer, thereby improving the de-noising effect.

In step 2, the reference frame $$f_t^{1r} = \underset{r \in I}{\arg\max} \; \text{laplacian}(|f_t^{1i}|)^2$$

is selected from all $f_t^{1i}$, where laplacian ( ) is the Laplacian, I is the set of mark numbers of images in the image set $B_t$.

In step 3, $f_t^{1j}$ is the non-reference image determined from all $f_t^{1i}$, where $f_t^{1j} \in B_t$, j ≠r, j≠r. Each frame $f_t^{1j}$ is aligned with the reference image $f_t^{1r}$ to obtain the aligned non-reference $f_t^{j2}$ and the optical flow diagram $m_t^{2j}$ corresponding to $f_t^{j2}$, $m_t^{2j}$=align($f_t^{1j}$, $f_t^{1r}$)

In step 4, the noise strength parameter noiseprofile=($\sigma_p$, $\sigma_g$) in the camera sensor is obtained, so as to obtain the noise graph $np_t^r = \sigma_p \times f_t^{1r} + \sigma_g$.

In step 5, Space2depth operation is performed on $f_t^{1r}$, $\{f_t^{2j}\}$ and $np_t^r$ respectively to obtain $f_t^{1rp}$, $\{f_t^{2jp}\}$ and $np_t^{rp}$, and $f_t^{1rp}$, $\{f_t^{2jp}\}$ and $np_t^{rp}$ are connected in parallel with $\{m_t^{2j}\}$ to obtain the input of the image de-noising model, $I_t$=concate($f_t^{1rp}$, $\{f_t^{2jp}\}$, $\{m_t^{2j}\}$, $np_t^{rp}$). The de-noised fusion image output from the image de-noising model is obtained after inputting $I_t$ into the image de-noising model. The fusion image is a RAW image.

Compared with the single-frame RAW image de-noising method in the related art, the multi-frame RAW image de-noising method based on Disflow alignment has significantly improved resolution.

Compared with the method based on neural network for end-to-end alignment and de-noising, the multi-frame RAW de-noising method based on Disflow alignment has the strongest de-noising ability and resolution.

Compared with the open source SIDD training set, the trained image de-noising model, which is trained based on the sample image set made of continuous frames extracted from high-definition video during the inverse image processing, has stronger texture detail resolution.

100 sets of sequences are randomly selected from the sample image set. Each set of sequences is a sample image subset determined based on five consecutive frames of RAW images taken for a shooting scene (which can be understood as a sampling scene). The FastDVDnet method is a method that uses network end-to-end implicit alignment and de-noising. The SIDD method uses the SIDD data set to train the same model as the image de-noising model used in the embodiments of the present disclosure.

Using the image de-noising method in the embodiments of the present disclosure and the existing image de-noising method, the 100 sets of selected sequences are subjected to de-noising processing, and the average value of the de-noised data corresponding to the 100 sets of sequences is calculated to obtain the de-noised data reflecting the de-noising effect.

The de-noised data of the image de-noising method provided by the embodiments of the present disclosure and the existing image de-noising method are shown in Table 4.

TABLE 4

| | De-noised Data Table | | | | |
|---|---|---|---|---|---|
| | Noise Graph | Single-frame RAW de-noising | 5 Frames FastDVDnet | 5 Frames SIDD Method | 5 Frames Current method |
| pSNR | 35.18 | 41.55 | 41.78 | 42.30 | 42.82 |
| pSNR_gain | 0 | +6.37 | +6.60 | +7.12 | +7.64 | pSNR is an abbreviation of Peak Signal to Noise Ratio.

It can be seen from Table 4 that the image de-noising method provided by the embodiment of the present disclosure corresponds to the highest pSNR, indicating that the image de-noising method provided by the embodiment of the present disclosure has the best de-noising effect in this example.

In the embodiment of the present disclosure, the optical flow diagram alignment method is used to align the multi-frame RAW images, and the reference image, the aligned non-reference image and the optical flow diagram are simultaneously input into the neural network model, that is, the image de-noising model, to provide sufficient effective information. This ensures that the image de-noising model has better de-noising ability, better detail texture resolution, and has no ghosts produced for moving objects having large-amplitude movements.

The foregoing method embodiments are described as a series of operations. One of ordinary skill in the art will understand that the present disclosure is not limited by the sequence of operations described, and the operations can be performed in other orders or simultaneously.

Corresponding to the foregoing method embodiments, the present disclosure also provides embodiments for apparatuses and corresponding terminals.

Figure 8:
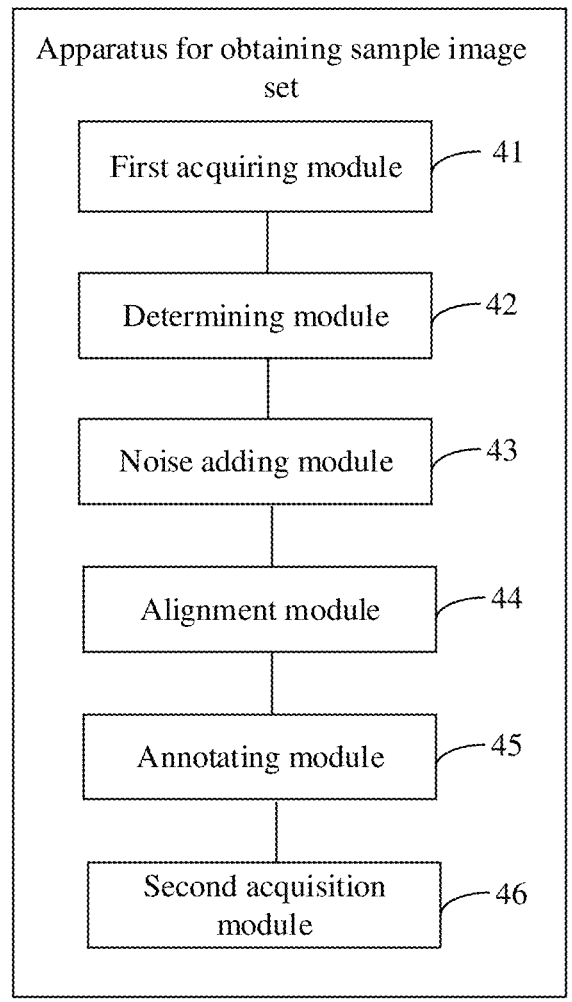
FIG. 8 is a block diagram of an apparatus for acquiring a sample image set according to an exemplary embodiment.

FIG. 8 is a block diagram of an apparatus for acquiring a sample image set according to an exemplary embodiment. The apparatus includes: a first acquisition module 41, a determination module 42, a noise addition module 43, an alignment module 44, an annotating module 45, and a second acquisition modules 46.

The first acquiring module 41 is configured to acquire a plurality of frame images continuously shot for a shooting scene;

The determining module 42 is configured to determine, as a reference image, one of the plurality of frame images, and determine, as non-reference images, remaining ones of the plurality of frame images other than the one determined as the reference image.

The noise adding module 43 is configured to perform a noise addition processing on a format-converted reference image and each format-converted non-reference image respectively.

The alignment module 44 is configured to align each obtained noise-added non-reference image with the noise-added reference image to obtain an aligned non-reference image;

The annotating module 45 is configured to annotate the format-converted reference image with pixel information to obtain a non-noise-added reference image;

The second acquisition module 46 is configured to acquire the sample image set, the sample image set including: the aligned non-reference image, the noise-added reference image, and the non-noise-added reference image.

In an embodiment, the noise adding module 43 may include: an inverse processing sub-module and a noise addition sub-module.

The inverse processing sub-module is configured to perform inverse image processing on the format-converted reference image and non-reference image, respectively, the inverse image processing includes: inverse white balance transformation, inverse vignetting transformation, and inverse digital gain transformation;

The noise adding sub-module is configured to perform noise addition processing on the reference image and the non-reference image subjected to the inverse image processing.

In an embodiment, the inverse processing sub-module may include: a first inverse processing unit, a second inverse processing unit, and a third inverse processing unit.

The first inverse processing unit is configured to perform inverse white balance transformation on the format-converted reference image to obtain a first reference image, and perform inverse white balance transformation on the format-converted non-reference image to obtain the first non-reference image.

The second inverse processing unit is configured to, for each pixel position in the first reference image, divide the pixel value at the pixel position by the pixel value at a same pixel position in the target vignetting gain image to obtain the second reference images, and, for each pixel position in the first non-reference image, divide the pixel value of the pixel position by the pixel value of a same pixel position in the target vignetting gain image to obtain a second non-reference image.

The third inverse processing unit is configured to perform inverse digital gain transformation on the second reference image and the second non-reference image, respectively.

In an embodiment, the alignment module 44 may include: a determination sub-module and an alignment sub-module.

The determining sub-module is configured to determine, based on the noise-added non-reference image and the noise-added reference image, an optical flow diagram corresponding to the noise-added non-reference image.

The alignment sub-module is configured to align the noise-added non-reference image with the noise-added reference image according to the optical flow diagram.

In an embodiment, both the noise-added non-reference image and the noise-added reference image are RAW images in Bayer format; the determination sub-module may include: an obtaining unit, a determining unit, and a generating unit.

The obtaining unit is configured to obtain, based on an average pixel value of each pixel unit in the noise-added non-reference image, a third non-reference image, and to obtain, based on an average pixel value in each pixel unit in the noise-added reference image, the third reference image, where each pixel unit includes one R pixel, two G pixels and one B pixel.

The determining unit is configured to determine an offset vector of each pixel point image in the third non-reference image relative to a same pixel point image in the third reference image.

The generating unit is configured to generate an optical flow diagram based on the offset vectors of all pixel points.

In an embodiment, the alignment sub-module may include: a splitting unit, a moving unit, and a combination unit; where, The splitting unit is configured to split the noise-added non-reference image into an R channel image, a G1 channel image, a G2 channel image, and a B channel image.

The moving unit is configured to move the pixel point image in each channel image according to the optical flow diagram;

The combination unit is configured to combine the four channel images subjected to the pixel point image movement.

In an embodiment, the second acquisition module 46 may be configured to acquire the sample image set which includes the optical flow diagram.

The device embodiments basically correspond to the method embodiments, and reference can be made to the description of the method embodiments for detailed operations of the modules/units. The device embodiments described above are exemplary, where the modules/units described as separate components may or may not be physically separated, and the components displayed as modules/units may be located in a place, or can be distributed to multiple networks. Some or all of the modules/units may be selected according to actual needs.

In an embodiment, an apparatus for acquiring a sample image set includes: a processor; and a memory for storing instructions executable by the processor; wherein the processor is configured to: acquire a plurality of frame images continuously shot for a shooting scene; determine, as a reference image, one of the plurality of frame images, and determine, as non-reference images, remaining ones of the plurality of frame images other than the one determined as the reference image; perform a noise addition processing on a format-converted reference image and each format-converted non-reference image respectively, and align each noise-added non-reference image with a noise-added reference image to obtain an aligned non-reference image; annotate the format-converted reference image with pixel information to obtain a non-noise-added reference image; and acquire the sample image set, wherein the sample image set includes the aligned non-reference image, the noise-added reference image, and the non-noise-added reference image.

Figure 9:
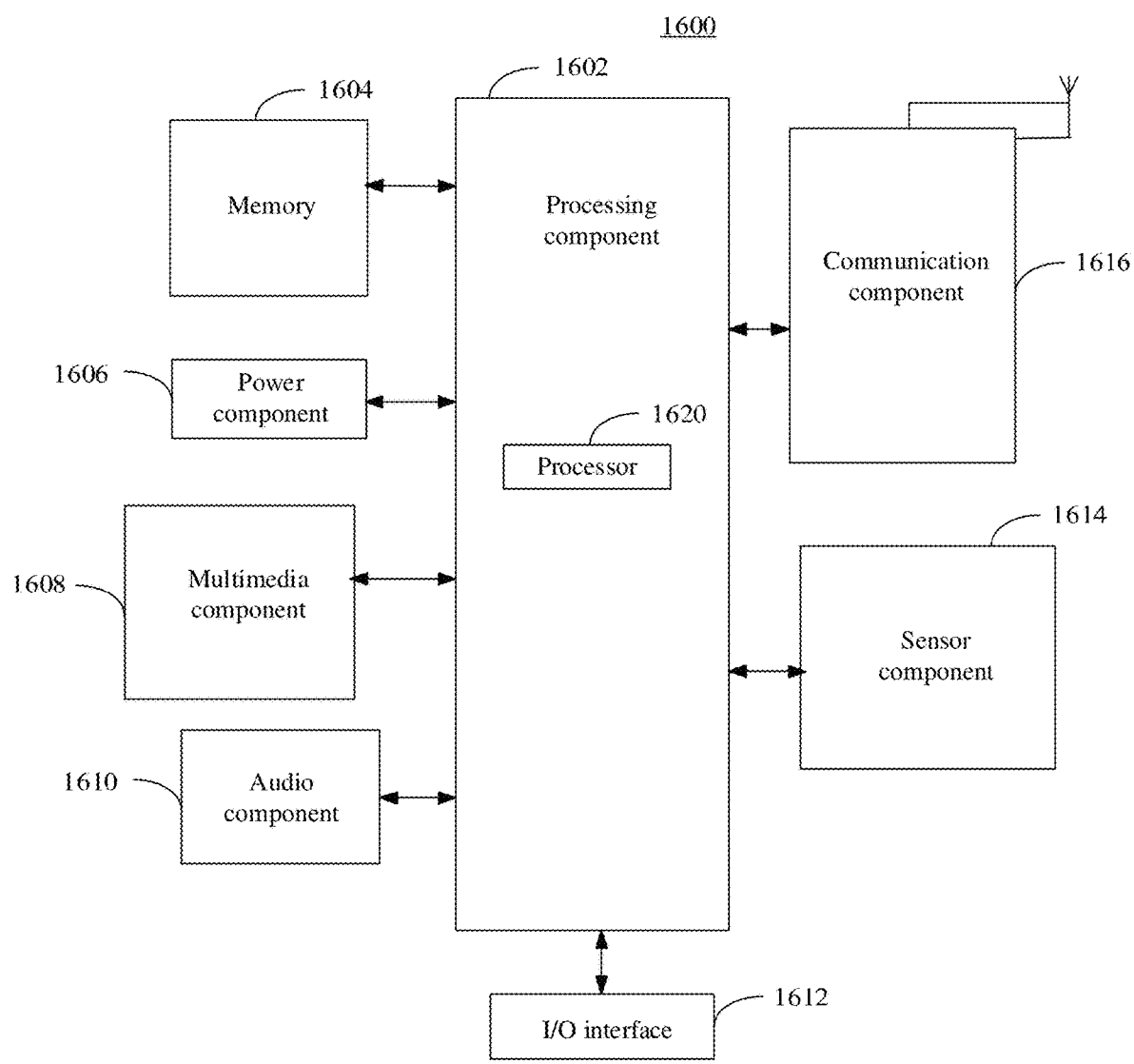
FIG. 9 is a schematic diagram of a device for acquiring a sample image set according to an exemplary embodiment.

FIG. 9 is a schematic diagram of a device 1600 for acquiring a sample image set according to an exemplary embodiment. For example, the device 1600 has a wireless Internet access function, and may be user equipment, such as a mobile phone, a computer, a digital broadcasting terminal, a messaging device, a game console, a tablet device, a medical device, a fitness device, a personal digital assistant, and a wearable device such as smart watches, smart glasses, smart bracelets, smart running shoes, etc.

According to FIG. 9, the device 1600 may include one or more of the following components: a processing component 1602, a memory 1604, a power component 1606, a multimedia component 1608, an audio component 1610, an input/output (I/O) interface 1612, a sensor component 1614, and Communication components 1616.

The processing component 1602 generally controls the overall operations of the device 1600, such as operations associated with display, phone calls, data communications, camera operations, and recording operations. The processing component 1602 may include one or more processors 1620 to execute instructions to complete all or part of the steps in the above method. In addition, the processing component 1602 may include one or more modules to facilitate interaction between the processing component 1602 and other components. For example, the processing component 1602 may include a multimedia module to facilitate interaction between the multimedia component 1608 and the processing component 1602.

The memory 1604 is configured to store various types of data to support operation in the device 1600. Examples of these data include instructions for any application or method operating on the device 1600, contact data, phone book data, messages, pictures, videos, and so on. The memory 1604 may be implemented by any type of volatile or nonvolatile storage device or a combination thereof, such as static random access memory (SRAM), electrically erasable programmable read only memory (EEPROM), erasable and removable programmable read only memory (EPROM), programmable read only memory (PROM), read only memory (ROM), magnetic memory, flash memory, magnetic disk or optical disk.

The power supply component 1606 provides power to various components of the device 1600. The power supply component 1606 may include a power management system, one or more power supplies, and other components associated with generating, managing, and distributing power for the device 1600.

The multimedia component 1608 includes a screen that provides an output interface between the device 1600 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, swipe, and gestures on the touch panel. The above-mentioned touch sensor may not only sense the boundary of the touch or sliding action, but also scan the duration and pressure related to the above-mentioned touch or sliding operation. In some embodiments, the multimedia component 1608 includes a front camera and/or a rear camera. When the device 1600 is in an operation mode, such as a shooting mode or a video mode, the front camera and/or the rear camera may receive external multimedia data. Each front camera and rear camera can be a fixed optical lens system or have focal length and optical zoom capabilities.

The audio component 1610 is configured to output and/or input audio signals. For example, the audio component 1610 includes a microphone (MIC), and when the device 1600 is in an operation mode, such as in a call mode, a recording mode, and a voice recognition mode, the microphone is configured to receive an external audio signal. The received audio signal may be further stored in the memory 1604 or sent via the communication component 1616. In some embodiments, the audio component 1610 further includes a speaker for outputting audio signals.

The I/O interface 1612 provides an interface between the processing component 1602 and a peripheral interface module. The peripheral interface module may be a keyboard, a click wheel, or a button. These buttons may include, but are not limited to: home button, volume button, start button, and lock button.

The sensor assembly 1614 includes one or more sensors for providing the device 1600 with status assessments in various aspects. For example, the sensor component 1614 can scan to the on/off state of the device 1600, and the relative positioning of the components. For example, the above components are the display and keypad of the device 1600. The sensor component 1614 can also scan the device 1600 or a component of the device 1600 for a change in position The presence or absence of user contact with device 1600, device 1600 orientation or acceleration/deceleration, and device 1600 temperature change. The sensor assembly 1614 may include a proximity sensor configured to scan for the presence of nearby objects without any physical contact. The sensor assembly 1614 may also include a light sensor, such as a CMOS or CCD image sensor, for use in imaging applications. In some embodiments, the sensor assembly 1614 may further include an acceleration sensor, a gyro sensor, a magnetic sensor, a pressure sensor, or a temperature sensor.

The communication component 1616 is configured to facilitate wired or wireless communication between the device 1600 and other devices. The device 1600 may access a wireless network based on a communication standard, such as WiFi, 4G or 5G, or a combination thereof. In an exemplary embodiment, the communication component 1616 receives a broadcast signal or broadcast related information from an external broadcast management system via a broadcast channel. In an exemplary embodiment, the communication component 1616 described above further includes a near field communication (NFC) module to facilitate short-range communication. In an exemplary embodiment, the communication component 1616 can be implemented based on radio frequency identification (RFID) technology, infrared data association (IrDA) technology, ultra-wideband (UWB) technology, Bluetooth (BT) technology and other technologies.

In an exemplary embodiment, the device 1600 may include one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic components.

In an exemplary embodiment, a non-transitory computer-readable storage medium is provided, for example, the memory 1604 including instructions. When the instructions in the storage medium are executed by the processor 1620 of the device 1600, the device 1600 can perform a method of obtaining a sample image set, which includes: acquiring a plurality of frame images continuously shot for a shooting scene; determining, as a reference image, one of the plurality of frame images, and determining, as non-reference images, remaining ones of the plurality of frame images other than the one determined as the reference image; performing a noise addition processing on a format-converted reference image and each format-converted non-reference image respectively, and aligning each noise-added non-reference image with a noise-added reference image to obtain an aligned non-reference image; annotating the format-converted reference image with pixel information to obtain a non-noise-added reference image; and acquiring the sample image set, the sample image set including the aligned non-reference image, the noise-added reference image, and the non-noise-added reference image.

The non-transitory computer-readable storage medium may be ROM, random access memory (RAM), CD-ROM, magnetic tape, floppy disk, optical data storage device, or the like.

Figure 10:
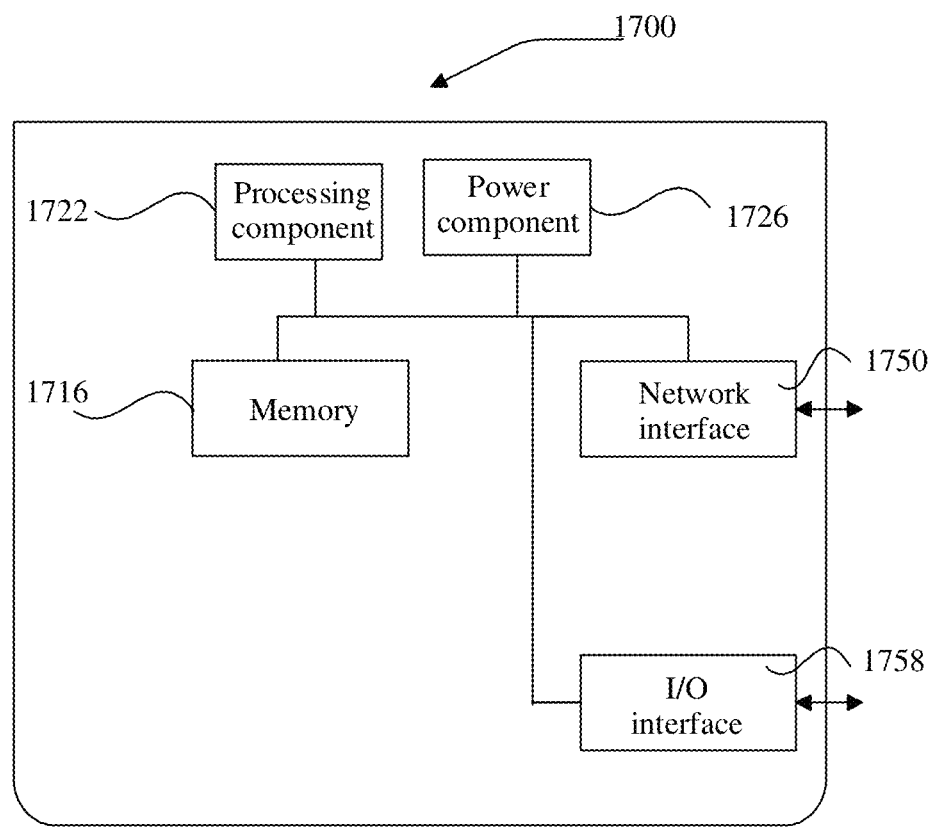
FIG. 10 is a schematic diagram of a device for acquiring a sample image set according to an exemplary embodiment.

FIG. 10 is a schematic diagram of a device 1700 for acquiring a sample image set according to an exemplary embodiment. For example, the device 1700 may be provided as an application server. Referring to FIG. 10, the device 1700 includes a processing component 1722, which further includes one or more processors, and memory resources represented by a memory 1716, for storing instructions executable by the processing component 1722, such as application programs. The application program stored in the memory 1716 may include one or more modules each corresponding to a set of instructions. In addition, the processing component 1722 is configured to execute instructions to perform the above-described method of acquiring a sample image set.

The device 1700 may also include a power component 1726 configured to perform power management of the device 1700, a wired or wireless network interface 1750 configured to connect the device 1700 to the network, and an input output (I/O) interface 1758. The device 1700 can operate based on an operating system stored in the memory 1716, such as Android, iOS, Windows Server™, Mac OS X™, Unix™, Linux™, FreeBSD™, etc.

In an exemplary embodiment, a non-transitory computer-readable storage medium including instructions, such as the memory 1716 including instructions, is provided. The instructions can be executed by the processing component 1722 of the device 1700 to perform the above described method. For example, the non-transitory computer-readable storage medium may be ROM, random access memory (RAM), CD-ROM, magnetic tape, floppy disk, optical data storage device, or the like.

Other embodiments of the present disclosure will be apparent to those skilled in the art from consideration of the specification and practice of the present. This application is intended to cover any variations, uses, or adaptive changes of this disclosure that follow the general principles of this disclosure and include common general knowledge or customary technical means in the technical field not disclosed in this disclosure. The description and examples are to be considered exemplary only, and the true scope and spirit of this disclosure are indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for obtaining a sample image set, comprising:
   acquiring a plurality of frame images continuously shot for a shooting scene;
   determining, as a reference image, one of the plurality of frame images, and determining, as non-reference images, remaining ones of the plurality of frame images other than the one determined as the reference image;
   performing a noise addition processing on a format-converted reference image and each format-converted non-reference image respectively, wherein the format-converted reference image and each format-converted non-reference image are RAW images in a Bayer format that are obtained through image format conversion;
   aligning each noise-added non-reference image with a noise-added reference image to obtain an aligned non-reference image;
   annotating the format-converted reference image with pixel information to obtain a non-noise-added reference image; and
   acquiring the sample image set, the sample image set including the aligned non-reference image, the noise-added reference image, and the non-noise-added reference image,
   wherein the performing the noise addition processing on the format-converted reference image and each format-converted non-reference image respectively comprises:
   performing an inverse image processing on the format-converted reference image and the format-converted non-reference image respectively, the inverse image processing including an inverse white balance transformation, an inverse vignetting transformation, and an inverse digital gain transformation; and
   performing the noise addition processing on the format-converted reference image and the format-converted non-reference image subjected to the inverse image processing,
   wherein the performing the inverse image processing on the format-converted reference image and the format-converted non-reference image respectively comprises:
   performing the inverse white balance transformation on the format-converted reference image to obtain a first reference image, and performing the inverse white balance transformation on the format-converted non-reference image to obtain a first non-reference image;
   dividing a pixel value at each pixel position in the first reference image by a pixel value of a same pixel position in a target vignetting gain image to obtain a second reference image, and dividing a pixel value at each pixel position in the first non-reference image by a pixel value at a same pixel position in the target vignetting gain image to obtain a second non-reference image; and
   performing the inverse digital gain transformation on the second reference image and the second non-reference image, respectively.

2. The method of claim 1, wherein the aligning each noise-added non-reference image with a noise-added reference image comprises:
   determining an optical flow diagram corresponding to the noise-added non-reference image based on the noise-added non-reference image and the noise-added reference image; and
   aligning the noise-added non-reference image with the noise-added reference image according to the optical flow diagram.

3. The method of claim 2, wherein the noise-added non-reference image and the noise-added reference image are RAW images in Bayer format, and wherein determining the optical flow diagram corresponding to the noise-added non-reference image based on the noise-added non-reference image and the noise-added reference image comprises:
   obtaining a third non-reference image based on an average pixel value of each pixel unit in the noise-added non-reference image, and obtaining a third reference image based on an average pixel value of each pixel unit in the noise-added reference image, each pixel unit including one red (R) pixel, two green (G) pixels, and one blue (B) pixel;
   determining an offset vector of each pixel point image in the third non-reference image relative to a same pixel point image in the third reference image; and
   generating the optical flow diagram based on the offset vectors of all pixel points.

4. The method of claim 3, wherein the aligning the noise-added non-reference image with the noise-added reference image according to the optical flow diagram comprises:
   splitting the noise-added non-reference image into an R channel image, a first-G channel image, a second-G channel image, and a B channel image; and
   moving a pixel point image in each channel image according to the optical flow diagram, and combining the channel images subjected to the pixel point image movement.

5. The method of claim 2, wherein the acquiring a sample image set comprises acquiring a sample image set that includes the optical flow diagram.

6. An apparatus for obtaining a sample image set, comprising:

a processor; and a memory configured to store instructions executable by the processor, wherein the processor is configured to:

acquire a plurality of frame images continuously shot for a shooting scene;

determine, as a reference image, one of the plurality of frame images, and determine, as non-reference images, remaining ones of the plurality of frame mages other than the one determined as the reference image;

perform a noise addition processing on a format-converted reference image and each format-converted non-reference image respectively, wherein the format-converted reference image and each format-converted non-reference image are RAW images in a Bayer format that are obtained through image format conversion;

align each noise-added non-reference image with a noise-added reference image to obtain an aligned non-reference image;

annotate the format-converted reference image with pixel information to obtain a non-noise-added reference image; and acquire the sample image set, the sample image set including the aligned non-reference image, the noise-added reference image, and the non-noise-added reference image, wherein in performing the noise addition processing on the format-converted reference image and each format-converted non-reference image respectively, the processor is further configured to:

perform an inverse image processing on the format-converted reference image and the format-converted non-reference image respectively, the inverse image processing including an inverse white balance transformation, an inverse vignetting transformation, and an inverse digital gain transformation; and perform the noise addition processing on the reference image and the non-reference image subjected to the inverse image processing, wherein in performing the inverse image processing on the format-converted reference image and the format-converted non-reference image respectively, the processor is further configured to:

perform the inverse white balance transformation on the format-converted reference image to obtain a first reference image, and perform the inverse white balance transformation on the format-converted non-reference image to obtain a first non-reference image;

divide a pixel value at each pixel position in the first reference image by a pixel value of a same pixel position in a target vignetting gain image to obtain a second reference Image, and divide a pixel value at each pixel position in the first non-reference image by a pixel value of a same pixel position in the target vignetting gain image to obtain a second non-reference image; and perform the inverse digital gain transformation on the second reference image and the second non-reference image, respectively.

7. The apparatus of claim 6, wherein in aligning each noise-added non-reference image with a noise-added reference image, the processor is further configured to:

determine an optical flow diagram corresponding to the noise-added non-reference image based on the noise-added non-reference image and the noise-added reference image; and align the noise-added non-reference image with the noise-added reference image according to the optical flow diagram.

8. The apparatus of claim 7, wherein the noise-added non-reference image and the noise-added reference image are RAW images in Bayer format; and wherein in determining the optical flow diagram corresponding to the noise-added non-reference image based on the noise-added non-reference image and the noise-added reference image, the processor is further configured to:

obtain a third non-reference image based on an average pixel value of each pixel unit in the noise-added non-reference image, and obtain a third reference image based on an average pixel value of each pixel unit in the noise-added reference image, wherein each pixel unit includes one red (R) pixel, two green (G) pixels, and one blue (B) pixel;

determine an offset vector of each pixel point image in the third non-reference image relative to a same pixel point image in the third reference image; and generate the optical flow diagram based on the offset vectors of all pixel points.

9. The apparatus of claim 8, wherein in aligning the noise-added non-reference image with the noise-added reference image according to the optical flow diagram, the processor is further configured to:

split the noise-added non-reference image into an R channel image, a first G channel image, a second G channel image, and a B channel image;

move the pixel point image in each channel image according to the optical flow diagram; and combine the channel images subjected to the pixel point image movement.

10. The apparatus of claim 7, wherein acquiring a sample image set, the processor is further configured to: acquire the sample image set that includes the optical flow diagram.

11. A non-transitory computer-readable storage medium having stored thereon instructions that, when executed by a processor of a mobile terminal, cause the mobile terminal to perform a method for obtaining a sample image set, the method comprising:

acquiring a plurality of frame images continuously shot for a shooting scene;

determining, as a reference image, one of the plurality of frame images, and determining, as non-reference images, remaining ones of the plurality of frame images other than the one determined as the reference image;

performing a noise addition processing on a format-converted reference image and each format-converted non-reference image respectively, wherein the format-converted reference image and each format-converted non-reference image are RAW images in a Bayer format that are obtained through image format conversion;

aligning each noise-added non-reference image with a noise-added reference image to obtain an aligned non-reference image;

annotating the format-converted reference image with pixel information to obtain a non-noise-added reference image; and acquiring the sample image set, the sample image set including the aligned non-reference image, the noise-added reference image, and the non-noise-added reference image, wherein the performing the noise addition processing on the format-converted reference image and each format-converted non-reference image respectively comprises:
performing an inverse image processing on the format-converted reference image and the format-converted non-reference image respectively, the inverse image processing including an inverse white balance transformation, an inverse vignetting transformation, and an inverse digital gain transformation; and
performing the noise addition processing on the format-converted reference image and the format-converted non-reference image subjected to the inverse image processing,
wherein the performing the inverse image processing on the format-converted reference image and the format-converted non-reference image respectively comprises:
performing the inverse white balance transformation on the format-converted reference image to obtain a first reference image, and performing the inverse white balance transformation on the format-converted non-reference image to obtain a first non-reference image;
dividing a pixel value at each pixel position in the first reference image by a pixel value of a same pixel position in a target vignetting gain image to obtain a second reference image, and dividing a pixel value at each pixel position in the first non-reference image by a pixel value at a same pixel position in the target vignetting gain image to obtain a second non-reference image; and
performing the inverse digital gain transformation on the second reference image and the second non-reference image, respectively.

12. The non-transitory computer-readable storage medium of claim 11, wherein the aligning each noise-added non-reference image with a noise-added reference image comprises:
determining an optical flow diagram corresponding to the noise-added non-reference image based on the noise-added non-reference image and the noise-added reference image; and
aligning the noise-added non-reference image with the noise-added reference image according to the optical flow diagram.

13. The non-transitory computer-readable storage medium of claim 12, wherein the noise-added non-reference image and the noise-added reference image are RAW images in Bayer format, and wherein determining the optical flow diagram corresponding to the noise-added non-reference image based on the noise-added non-reference image and the noise-added reference image comprises:
obtaining a third non-reference image based on an average pixel value of each pixel unit in the noise-added non-reference image, and obtaining a third reference image based on an average pixel value of each pixel unit in the noise-added reference image, each pixel unit including one red (R) pixel, two green (G) pixels, and one blue (B) pixel;
determining an offset vector of each pixel point image in the third non-reference image relative to a same pixel point image in the third reference image; and
generating the optical flow diagram based on the offset vectors of all pixel points.

14. The non-transitory computer-readable storage medium of claim 13, wherein the aligning the noise-added non-reference image with the noise-added reference image according to the optical flow diagram comprises:
splitting the noise-added non-reference image into an R channel image, a first-G channel image, a second-G channel image, and a B channel image; and
moving a pixel point image in each channel image according to the optical flow diagram, and combining the channel images subjected to the pixel point image movement.

* * * * *